Aug. 23, 1932.    J. F. DOLLER    1,873,190
ARMREST
Filed May 16, 1931    2 Sheets-Sheet 1

Inventor
Joseph F. Doller,

By Clarence A. O'Brien
Attorney

Aug. 23, 1932.    J. F. DOLLER    1,873,190
ARMREST
Filed May 16, 1931    2 Sheets-Sheet 2
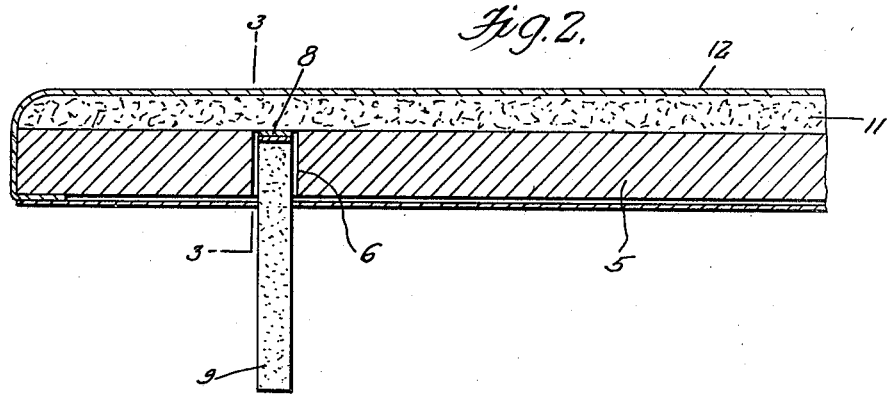
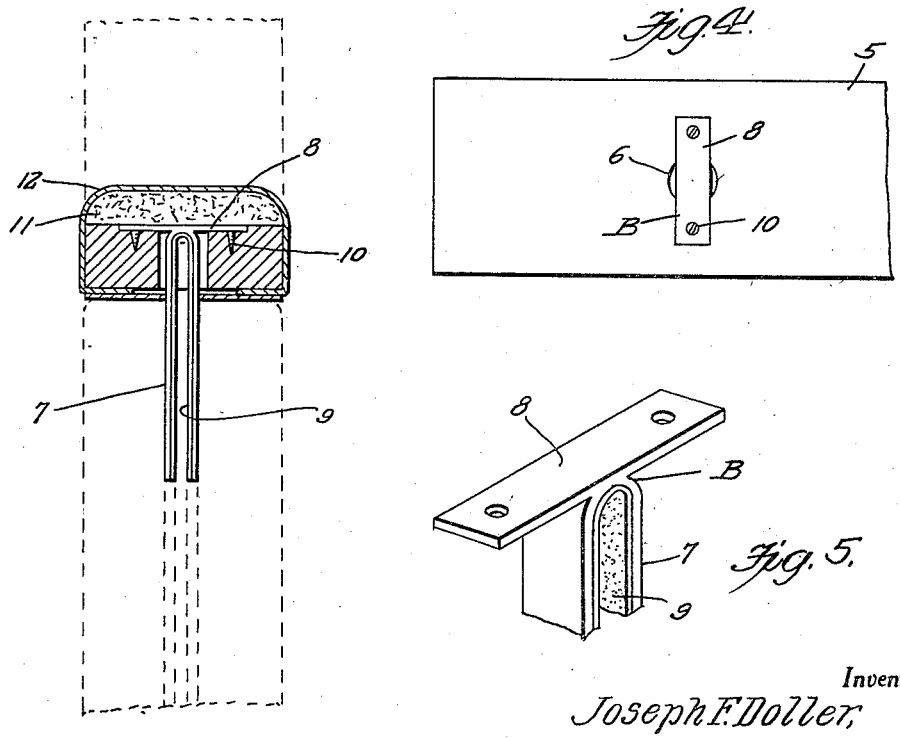
Inventor
Joseph F. Doller,
By Clarence A. O'Brien
Attorney Patented Aug. 23, 1932

1,873,190

UNITED STATES PATENT OFFICE

JOSEPH F. DOLLER, OF ST. LOUIS, MISSOURI

ARMREST

Application filed May 16, 1931. Serial No. 537,933.

The present invention relates to an arm rest and has for its prime object to provide a structure which may be conveniently mounted on the upper edge of the glass in an automobile door and is designed particularly for the comfort of the driver of an automobile so that he may rest his elbow on the arm rest while driving and the like.

Another very important object of the invention resides in the provision of an arm rest of this nature which is exceedingly simple in its construction, inexpensive to manufacture, easy to mount in place and remove, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 2 is a fragmentary longitudinal section therethrough.

Figure 3 is a transverse section therethrough taken on the line 3—3 of Figure 2.

Figure 4 is a fragmentary top plan view of the block showing one of the brackets, and Figure 5 is a perspective view of one of the brackets.

Figure 1:
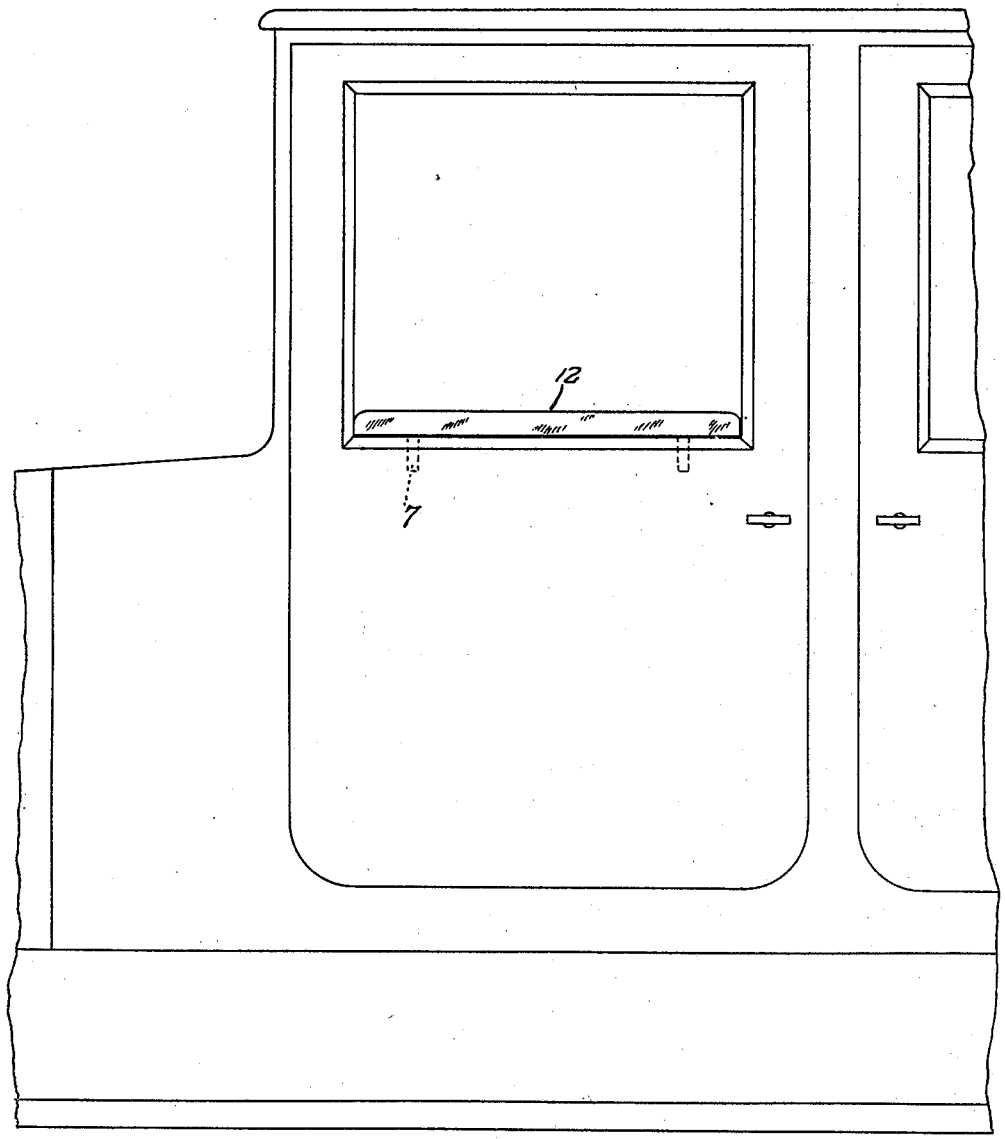
Figure 1 is a fragmentary side elevation of an automobile showing the arm rest in place.

Referring to the drawing in detail it will be seen that the numeral 5 denotes an elongated block with openings 6 therethrough. Letters B denote brackets including inverted U-shaped portions 7 having plates 8 formed integrally with the bight of the U-shaped portion and extending thereacross to the sides of said portion. The U-shaped portion may be lined with suitable material such as felt or the like as is indicated at 9.

The U-shaped portion 7 of the brackets are extended down through the openings 6 and the plates 8 are fastened to the top of the block by screws 10 or the like. On top of the block a suitable padding 11 and a covering 12 is disposed about the padding and the block. The U-shaped portions of the brackets are adapted to straddle the upper edge of the window in the door of an automobile so that a person may rest his or her arms comfortably thereon as will be quite apparent to those skilled in this art.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An arm rest of the class described including, in combination an elongated block having openings therein, brackets, each bracket comprising an inverted U-shaped portion with a plate across and joined to the bight thereof, said U-shaped portion extending down through the openings and the plates being fastened to the upper surface of the block, padding on top of the block, and covering extending over the padding and against the bottom side of the block, said covering at its bottom portion being provided with openings registering with the openings in the block.

In testimony whereof I affix my signature.

JOSEPH F. DOLLER.